United States Patent [19]  [11] 3,797,063
Schrauf  [45] Mar. 19, 1974

[54] SCRAPER HOLDER DEVICE FOR A DOUGH PROCESSING MACHINE

[75] Inventor: Karl Schrauf, Vorarlberg, Austria

[73] Assignee: Seewer AG Maschinenfabrik, Burgdorf, Switzerland

[22] Filed: Nov. 2, 1972

[21] Appl. No.: 303,036

[30] Foreign Application Priority Data
Nov. 6, 1971  Germany.................... 7141948[U]

[52] U.S. Cl.............................. 15/256.51, 425/317
[51] Int. Cl............................................... A21c 3/02
[58] Field of Search......... 15/256.5, 256.51, 256.53; 100/174; 99/450.1, 443; 425/363, 367, 317

[56] References Cited
UNITED STATES PATENTS
3,327,652  6/1967  Seewer............................ 15/256.51
1,431,016  10/1922  Mackintosh...................... 15/256.5

Primary Examiner—Leon G. Machlin
Attorney, Agent, or Firm—Werner W. Kleeman

[57] ABSTRACT

A scraper holder device for use with a dough processing machine having a pair of rollers mounted at their ends in bearing housings. A scraper or stripper element having a scraper edge bears by means of such scraper edge, under the action of spring pressure, against one of the rollers, for instance the lower roller. The scraper holder device embodies a carrier or support member for the scraper element, rotatably mounted at the bearing housings about an axis parallel to the axes of the rollers and provided at least at one of its ends with a resilient bar which, after flexing or bending same, causes the scraper edge of the scraper element to contact against the roller. This resilient bar can be introduced at its free end behind a supporting element, such as a brace or support pin provided at the neighboring bearing housing.

5 Claims, 3 Drawing Figures

PATENTED MAR 19 1974　　3,797,063

SCRAPER HOLDER DEVICE FOR A DOUGH PROCESSING MACHINE

BACKGROUND AND SUMMARY OF THE INVENTION

The present invention relates to a new and improved construction of scraper holder device for use in a dough processing machine having a pair of rollers or rolls mounted at their ends in bearing housings and possessing a scraper element having a scraper edge which, under the action of spring pressure, is retained in contact with one of the rollers, for instance the lower roller.

It is a primary object of the present invention to provide an improved scraper holder which insures for a functionally correct angular positioning of the scraper element with respect to the surface of the associated roller for the purpose of achieving a positive and faultless removal of the dough sheet or band in the event the latter tends to adhere to the surface of the roller.

A further significant object of the present invention relates to a scraper holder equipped with means for urging the scraper element with a substantially uniform pressure along its entire scraper edge into contact with the roller surface, and wherein such pressure should not appreciably change even upon wear of the scraper element.

Now in order to implement these and still further objects of the invention, which will become more readily apparent as the description proceeds, the scraper holder of this development is manifested by the features that it embodies a scraper carrier member which is rotatably mounted at the bearing housings about an axis which is essentially parallel to the axes of the rollers. A resilient member in the form of, for instance, a spring bar is provided at least at one end of the scraper carrier member and this resilient bar, after flexing thereof, brings about contact of the scraper edge of the scraper element with the associated roller. The free end of the spring bar engages behind a supporting element, for instance a bracing or support pin or the like provided at the neighboring bearing housing.

According to a preferred embodiment of the invention, the scraper element, after release of the resilient or spring bar and pivoting of the carrier member, can be easily removed and without the aid of tools, for instance for cleaning purposes, and it is equally easy to again mount such scraper element in its preparatory operating position. To this end, it is advantageously contemplated that the scraper element and the carrier member are provided with components or parts which, in the operable position of the scraper element, insure for a positive, non-shiftable retention of the scraper element at the carrier member, yet after rendering ineffectual the resilient or spring bar and pivoting away the scraper element from the roller permit relatively easy dismantling of the scraper element together with the components secured thereto.

A simple constructional manifestation of the invention is characterized by the features that contact or support straps are secured to the carrier member, and at the supporting surfaces of which there protrude holding pins. At the one flat face or side of the scraper element there is attached the marginal portion of one leg of an angle profile bar or member, the other leg of which is provided with receiving holes or apertures for the holding pins. The arrangement is such that with the scraper element mounted, such bears by means of its spine or back portion against the carrier member, the leg of the angle profile bar secured thereto bears against the lengthwise extending face or side of the carrier member confronting the roller and the holding pins engage into the receiving holes, wherein additionally, the leg of the angle profile bar possessing the receiving bores preferably bears against the contact straps.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
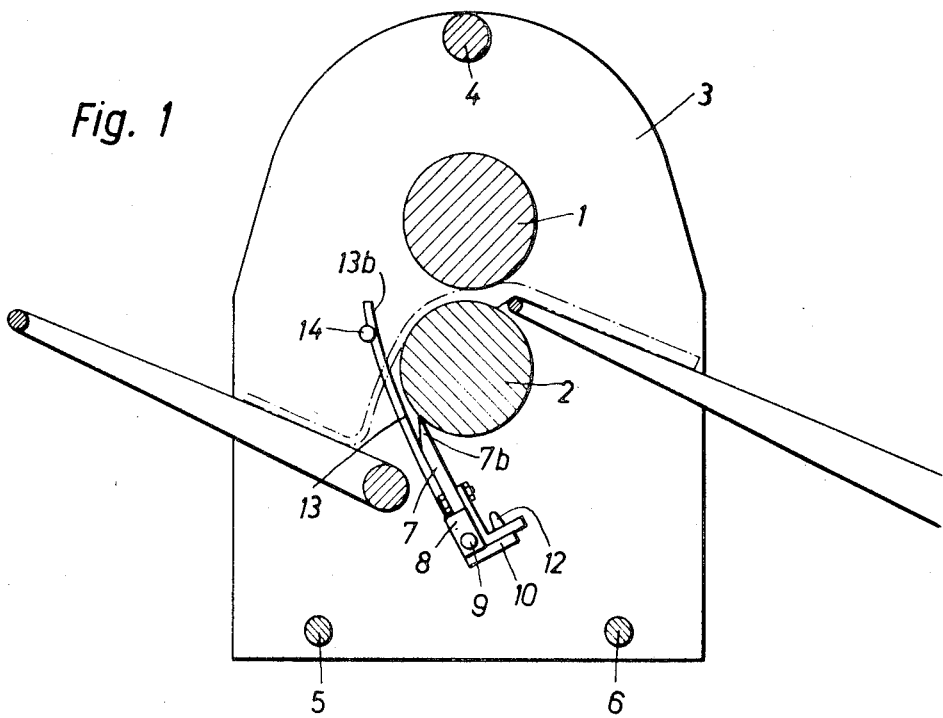
FIG. 1 is a schematic sectional view of a dough roller machine equipped with the scraper holder arrangement of this invention.
Figure 2:
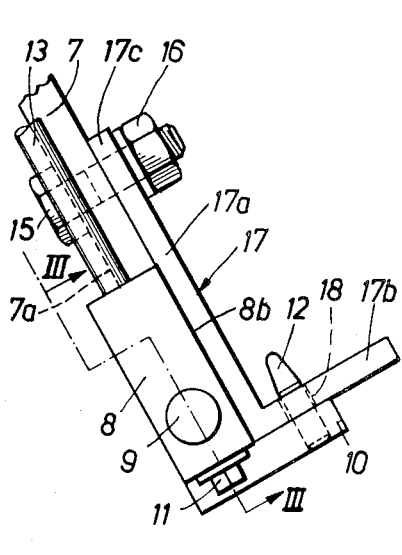
FIG. 2 is an enlarged detail view of a portion of the equipment depicted in FIG. 1.
Figure 3:
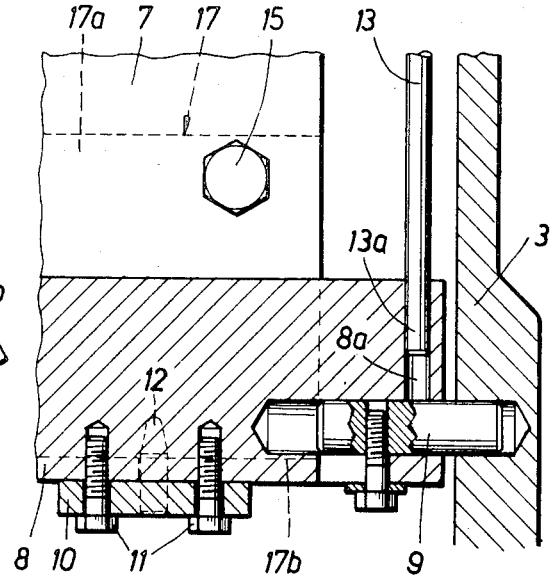
FIG. 3 is a fragmentary side view of the showing of FIG. 2, partially in section, taken substantially along the line III-III thereof.

Describing now the drawing, in FIG. 1 there is illustrated enough of the dough processing machine to enable one skilled in the art to readily understand the underlying concepts of this development. Hence, it will be seen that this dough processing machine which is a dough rolling machine has a pair of rollers or rolls 1 and 2, wherein roller 1 defines an upper roller and roller 2 a lower roller. These rollers 1 and 2 are rotatably mounted at both of their ends in bearing housings 3 which are rigidly interconnected by bolts or tie rods 4, 5, and 6.

As previously indicated, there is provided for the dough processing machine a scraper or stripper element 7 which is intended to bear against the surface of one of the associated rollers, in this case for instance the lower roller 2. According to the invention there is provided a holder or support arrangement for such scraper element 7, the details of which will now be considered.

A carrier or support member 8 consisting of a flat iron bar or plate is mounted at both of its ends by means of a respective sliding bearing bolt 9 in the bearing housings 3, and specifically such that it is rotatable about an axis which is essentially parallel to the axes of the rollers 1 and 2. At each end of the carrier member 8 there is secured, to the underside of such carrier member 8, a respective contact member or strap 10 with the aid of screws 11 or other suitable fastening expedients. A holding pin 12 is fixedly seated in each such contact strap 10. A resilient member in the form of a resilient or spring bar 13 is fixed at one end 13a in transversely extending bore holes 8a provided completely at one end and/or the other end of the carrier member 8. A respective supporting element, here in the form of a support or bracing pin 14, is fixedly seated or mounted at the bearing housings 3 and behind which there can engage the free end portion 13b of the associated resilient bar or rod 13.

The marginal or edge portion 17c of one leg 17a of an angle profile member or bar 17 is secured, with the aid of screws 15 and nuts 16, to the scraper element 7, the other leg 17b of which is provided with receiving holes or bores 18 for the holding pins 12. The arrangement is perfected such that with the scraper element 7 mounted, such bears by means of its spine or back portion 7a against the carrier member 8, the leg 17a of the angle profile member or bar 17 bears against the lengthwise extending side 8b of the carrier member 8 which confronts the roller 2, and the holding pins 12 engage into the receiving holes 18, wherein preferably additionally the leg 17b of the angle member 17 bears upon the contact straps 10. In the operable working position of the scraper element 7, there is thus realized in this way a positive or form-locking, non-shiftable retention of the scraper element 7 at the carrier member 8. Additionally, the free end portions of the resilient rods 13 are introduced behind the supporting pins 14, so that owing to the resilient restoring or return action of the flexed resilient rods 13 the scraper element 7 can be pressed by means of its scraper working edge 7b against the outer surface of the roller 2. The contact pressure is uniform throughout the entire length of the scraper edge 7b of the scraper element 7 and only changes slightly during wear of the scraper element 7. The scraper element, during operation of the machine, cannot unintentionally depart from its effective or operable working position.

If the scraper element 7 should be removed, for instance for cleaning same, then this can occur in a most simple manner without the need to resort to the use of tools. It is only necessary to release the resilient bars 13 from the support pins 14. Then the carrier member 8 can be pivoted out away from the roller 2 and the scraper element 7 together with the angle profile bar or member 17 can be raised or lifted out. Reassembly of the components can occur in equally simple fashion with the reverse sequence of manipulations.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. A holder device for a scraper element for use with a dough processing machine having a pair of rollers mounted at their ends in bearing housings, the improvement comprising the combination of a scraper element having a scraper edge, resilient means for urging the scraper edge into contact with one of said rollers, a carrier member for the scraper element, means for rotatably mounting said carrier member at the bearing housings about an axis which is essentially parallel to the axes of the rollers, said resilient means for urging the scraper edge of the scraper element into contact with one of the rollers comprising a resilient member provided at least at one end of said carrier member, said resilient member comprising a spring bar, said resilient member when flexed urging the scraper edge of the scraper element into contact with said one roller, said resilient member having a free end, and supporting means behind which can be engaged said free end of said resilient member, and wherein said scraper element and said carrier member incorporate cooperating means which in the effective scraping position of the scraper element insure for a positive non-shiftable retention of the scraper element at the carrier member, yet after releasing the flexing of the spring bar and pivoting away the scraper element from said one roller allow for a simple removal of the scraper element together with said cooperating means thereof.

2. The holder device as defined in claim 1, wherein said supporting means comprises a bracing pin provided at the bearing housing neighboring said spring bar and behind which engages the free end of said spring bar.

3. The holder device as defined in claim 1, wherein said cooperating means of said carrier member comprises contact straps secured to the carrier member, said contact straps having contact surface means from which protrude holding pin means, said cooperating means of said scraper element comprising an angle member having a pair of legs with one leg secured to the scraper element and the other leg provided with receiving holes for the holding pin means, wherein with the scraper element mounted such scraper element bears with its back portion against the carrier member, the leg of the angle member secured to the scraper element bearing against a lengthwise extending side of the carrier member confronting the roller and the holding pin means engaging with the receiving holes of the other leg.

4. The holder device as defined in claim 3, wherein the leg of the angle member provided with the receiving holes bears upon the contact straps.

5. The holder device as defined in claim 3, wherein said scraper element has a flat face to which is secured said one leg of said angle member.

* * * * *